United States Patent Office 2,765,339
Patented Oct. 2, 1956

2,765,339

PREPARATION OF SALICYLALDOXIME ETHERS

Max N. Huffman, Oklahoma City, Okla., assignor to Lasdon Foundation, Inc., Yonkers, N. Y., a corporation of Delaware No Drawing. Application December 10, 1954, Serial No. 474,603

2 Claims. (Cl. 260—566)

This invention relates to certain novel amino-substituted alkoximes of salicylaldehyde, and to a process for the preparation of said compounds. The foregoing compounds, especially in the alpha-isomeric form, have valuable fungicidal and fungistatic properties and are active topically against fungi such as Candida albicans, Tricophyton mentagrophytes, Blastomyces dermatitis, Histoplasma capsulatum and Nocardia asteroides, and are effective fungicides in dilutions as low as one part per million.

The process of my invention is particularly useful in the preparation of amino-substituted alkoximes of salicylaldehyde having the following formula:

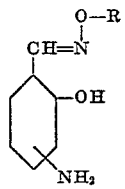

wherein R is a lower alkyl group containing from one to four carbon atoms, and may be a methyl, ethyl, propyl, isopropyl, butyl, isobutyl, secondary butyl or tertiary butyl group. These alkoxime compounds exist in two isomeric forms and it is the alpha form, shown in the formula above, which is found to be most active.

The novel process of my invention whereby the above compounds may be obtained comprises reacting a nitro-substituted salicylaldehyde of the following formula:

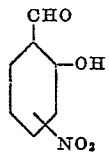

with stannous chloride in hydrochloric acid. The nitro group is reduced to the corresponding amino group during this reaction and a complex of stannic chloride and the amino-substituted salicylaldehyde formed on reduction is produced. This stannic chloride complex is then reacted directly with the desired alkoxylamine, the alkyl group having one to four carbon atoms, utilizing an alkaline reaction medium. The desired alkoxime is thus formed directly. Aqueous sodium hydroxide is preferably employed as the alkaline medium.

The reaction is usually carried out at a pH of from 9 to 12 and lowered to about 8. The reaction mixture is adjusted to this pH by the addition of an acid such as acetic acid, and at this pH a precipitate of stannic oxide is formed. After the stannic oxide precipitate is filtered off, the alkoxime formed may be separated by saturating the filtrate with a salt such as sodium chloride, adjusting the pH about 7.0, and cooling the neutralized filtrate to a temperature of between 0° C. and —10° C. Under these conditions, the amino-substituted salicylaldehyde alkoxime crystallizes from solution. The product may be filtered off and recrystallized from a mixture of ethyl alcohol and water.

In order further to illustrate my invention, the following examples are given:

Example I 8.4 parts by weight of stannous chloride are dissolved in 48 ml. of concentrated hydrochloric acid on a steam bath and 2 parts by weight of 5-nitro-salicylaldehyde are added. After heating and stirring for about 10 minutes, a complex of stannic chloride and 5-amino-salicylaldehyde precipitates. 4 parts by weight of methoxylamine hydrochloride are dissolved in 10 parts by weight of water and then heated on a steam bath. To the latter solution is then added a solution of 32 parts by weight of sodium hydroxide in 125 parts by weight of water while at the same time the hydrochloric acid solution of the stannic chloride complex of 5-amino-salicylaldehyde is also added. The latter is cooled to about 10° C. before being added to the hot methoxylamine hydrochloride solution. After the portionwise but simultaneous addition of the aqueous sodium hydroxide solution and the hydrochloric acid solution of the complex are completed, acetic acid is added until a pH of about 8.0 is reached. During the addition of acetic acid, stannic oxide precipitates. The reaction mixture is then heated and stirred for about 10 minutes and filtered while hot. The filtered precipitate is washed with a small amount of warm water. The filtrate is then saturated with sodium chloride, cooled, and the pH adjusted to 7.0. After the filtrate is cooled, it is maintained at a temperature between 0° C. and —10° C. until crystallization is complete. The crystalline product is separated and recrystallized from a mixture of ethyl alcohol and water. The product obtained is 5-amino-salicylaldehyde methoxime which forms faintly colored yellow to tan crystals, melting at 67–68° C.

Example II

By following the procedure described in Example I above, employing 3-nitro-salicylaldehyde, 3-amino-salicylaldehyde methoxime is obtained in the form of fine tan-colored needles melting at 82.5–83.5° C. (uncorr.). This product gives a precipitate with copper acetate. Analysis for $C_8H_{10}O_2N_2$ is:

| | Percent C | Percent H | Percent N |
|---|---|---|---|
| Calculated | 57.82 | 6.06 | 16.86 |
| Found | 57.89 | 6.12 | 16.92 |

This application is a continuation-in-part of my co-pending application Ser. No. 388,675, filed on October 27, 1953, now U. S. Patent 2,712,031.

It is understood that the foregoing detailed description is given merely by way of illustration and that many variations may be made therein without departing from the spirit of my invention.

Having described my invention, what I desire to secure by Letters Patent is:

1. In a process for the preparation of an amino-substituted salicylaldehyde alkoxime, the step which comprises reducing nitro-salicylaldehyde employing stannous chloride in hydrochloric acid as the reducing agent and forming a stannic chloride complex with the amino-salicylaldehyde obtained and reacting said complex in an alkaline medium with an alkoxylamine of the formula RO—NH$_2$ where R is a lower alkyl group.

2. In a process for the preparation of an amino-substituted salicylaldehyde methoxime, the step which comprises reducing nitro-salicylaldehyde employing stannous chloride in hydrochloric acid as the reducing agent and forming a stannic chloride complex with the amino-salicylaldehyde obtained and reacting said complex with methoxylamine in an alkaline medium containing sodium hydroxide.

References Cited in the file of this patent
UNITED STATES PATENTS
2,712,031   Huffman _____ June 28, 1955

OTHER REFERENCES

Traube et al.: "Ber. Deut. Chem.," vol. 53 (1920), page 1486.

Brady et al.: "J. Chem. Soc." (London 1927), page 893.